United States Patent [19]
Quinn

[11] Patent Number: 5,328,333
[45] Date of Patent: Jul. 12, 1994

[54] ROTATING THRUST-PRODUCING APPARATUS

[76] Inventor: Steven P. Quinn, 1198 Navigator Dr., #53, Ventura, Calif. 93001

[21] Appl. No.: 22,507

[22] Filed: Feb. 25, 1993

[51] Int. Cl.$^5$ .............................................. B63H 1/16
[52] U.S. Cl. ................. 416/193 R; 416/182; 416/185
[58] Field of Search ........... 416/179, 182, 185, 193 A, 416/193 R, 223 B

[56] References Cited

U.S. PATENT DOCUMENTS

| | | | |
|---|---|---|---|
| 95,292 | 10/1869 | Walsh | 416/193 |
| 1,374,256 | 4/1921 | Van Asperen . | |
| 1,786,017 | 12/1930 | Matta . | |
| 1,850,993 | 3/1932 | Chester . | |
| 1,971,820 | 8/1934 | Jackson . | |
| 2,176,542 | 10/1939 | Nicholson . | |
| 2,432,775 | 12/1947 | Lennon . | |
| 2,659,178 | 11/1953 | Van Hartesveldt . | |
| 2,922,277 | 1/1960 | Bertin . | |
| 2,990,137 | 6/1961 | Willis . | |
| 3,124,200 | 3/1964 | Wilson . | |
| 3,181,811 | 5/1965 | Maksim, Jr. . | |
| 3,182,929 | 5/1965 | Lemberger . | |
| 3,274,410 | 9/1966 | Boivie . | |
| 3,278,115 | 10/1966 | White et al. . | |
| 3,359,908 | 12/1967 | Toma . | |
| 3,824,028 | 7/1974 | Zenkner et al. . | |
| 4,047,832 | 9/1977 | Sforza . | |
| 4,419,049 | 12/1983 | Gerboth et al. . | |
| 4,566,699 | 1/1986 | Cucuzza . | |
| 4,666,373 | 5/1987 | Sugiura . | |

Primary Examiner—Edward K. Look
Assistant Examiner—Mark Sgantzos
Attorney, Agent, or Firm—Kelly, Bauersfeld & Lowry

[57] ABSTRACT

A circular foil connectable to a source of power for producing thrust in an axial direction when rotated, includes a flat circular plate and a plurality of closely spaced-apart fins fixed to an upper face of the circular plate, which occupy substantially the entire peripheral portion of the plate. A cylindrical hoop is fixed to the plate adjacent to radially inwardly extending edges of the fins to prevent fluid disposed adjacent to the circular plate and radially inwardly of the fins, from flowing radially outwardly and into the space between the fins as the circular foil is rotated. The foil is rotated at a sufficient speed to discharge fluid molecules from spaces between the fins at a rate faster than they can be replenished. This creates an imbalance of fluid pressure on the first side of the foil relative to an opposite second side thereof. As a result, the circular foil moves in the direction of the deficit.

13 Claims, 1 Drawing Sheet

ROTATING THRUST-PRODUCING APPARATUS

BACKGROUND OF THE INVENTION

This invention relates generally to devices for producing axial thrust by rotation in a fluid such as air or water. More particularly, the present invention relates to a rotatable circular foil designed to create an imbalance of fluid pressure acting on opposite faces of the circular foil to cause it to move in the direction of the deficit.

Devices for producing axial thrust by rotation in a fluid such as air or water and which have received an almost universal application are in the form of the so-called screw propellers. Screw propellers are generally designed on the basis of the characteristics of the particular fluid environment in which they will be used, and are widely used for aircraft and marine propulsion.

Generally, screw propellers for marine use are of considerably smaller diameter than propellers used for aircraft for absorbing comparable power and may have more blades than the aircraft propellers. Three-blade propellers have now become particularly popular for larger aircraft, while four-blade propellers have been extensively used for marine propulsion, particularly for larger craft.

The axial thrust produced by a screw propeller depends upon the degree of vacuum created on the surface of the blade on the side of the direction of its travel because of movement of the blade through the fluid at a certain angle to the general plane of rotation of the blade, and on the area of the blade at which such partial vacuum or reduced pressure is caused to act. The faster the rotation of the propeller blades, the greater is the degree of vacuum so created. Also, the greater the number of the blades on the propeller, the greater is the area at which fluid pressure acts to produce axial thrust.

However, limitation for both of the above factors exists in the fact that increase both in the speed of rotation and/or in the number of the blades beyond a certain limit, determined primarily by the nature of the fluid, causes rarification of the fluid to such an extent that in spite of increase in the degree of vacuum, the fluid pressure from the opposite side begins to decrease in a degree nullifying the beneficial effect of the increased vacuum. Therefore, limitation in the number of propeller blades, usually to three or four, determines the maximum area at which the fluid pressure acts on the propeller and, therefore, determines the total axial thrust produced thereby. In the case of aircraft propellers having three blades, such area may be equal, in effect, to only approximately 15% to 20% of the total circular area determine by the radius of the propeller.

In view of these limitations, propeller devices have been proposed which attempt to increase the effective area on which fluid pressure acts for producing the axial thrust, as compared with screw propellers, whereby a much greater total axial thrust is produced without increasing the overall radius of the propeller mechanism. An example is found in U.S. Pat. No. 3,124,200 to Everett E. Wilson. The propeller device disclosed therein includes, generally, a flat circular plate and a number of blades or fins extending upwardly from the plate generally from the center of the plate to its circumference, which blades or fins are generally inclined at an angle to capture fluid during rotation of the plate and create an axial lift-producing force. The blades or fins are arranged on the flat circular plate to encourage an evacuation of the fluid from the front surface of the plate as it is rotated to create a thrust-producing pressure imbalance.

Such disc-like alternatives to the standard screw propeller have not found wide acceptance. Although, theoretically, they should produce as much or greater thrust in an axial direction than screw propellers, prior disc propeller designs have failed to realize their full potential.

Accordingly, there has been a need for a novel rotating thrust-producing apparatus which is of simple construction, overcomes noted drawbacks of prior propeller mechanisms, and which is adaptable for use in most fluid environments. Additionally, a novel rotating thrust-producing apparatus is needed which is capable of causing a pressure reduction on an upper face of a flat circular plate while maintaining a lower face thereof at its original pressure to thereby form a pressure imbalance which causes the apparatus to move in the direction of pressure reduction. Moreover, such an improved apparatus is needed which effectively creates a vacuum over a portion of a rotating plate to realize the desired thrust and also to reduce drag on the apparatus itself. The present invention fulfills these needs and provides other related advantages.

SUMMARY OF THE INVENTION

The present invention resides in an improved propeller-like circular foil connectable to a source of power for producing thrust in an axial direction when rotated. The circular foil comprises a flat circular plate and a plurality of closely spaced-apart fins which are fixed to an upper face of the plate and which occupy substantially the peripheral portion of the plate. Means are provided for preventing fluid disposed adjacent to the circular plate and radially inwardly of the fins, from flowing radially outwardly and into space between the fins as the circular foil is rotated.

A "flat plate" as used herein refers, generally, to a disc-shaped structure which may be in the form of a spoked wheel or a wheel with no middle, i.e., a donut shaped wheel.

In a preferred form of the invention, each fin is fixed onto the circular plate at an angle of up to about 90 degrees relative to the respective tangent. More specifically, each fin is fixed to the upper face of the circular plate at an angle of from about 35 to 55 degrees. Moreover, each of the fins extends perpendicularly from the plate relative to the plane of the plate. The preventing means comprises a generally cylindrical hoop which is fixed to the circular plate adjacent to radially inwardly facing edges of the fins. The hoop extends axially from the upper face of the circular plate coextensively with the spaced-apart fins.

The present invention also resides in a novel method for producing thrust in a rotatable circular foil. The method comprises the steps of providing a circular foil as above described, rotating the plate sufficiently fast to discharge fluid from a space between adjacent fins radially away from a center portion of the foil, and preventing fluid disposed adjacent to the circular plate and radially inwardly of the fins, from flowing radially outwardly and into the spaces between the fins as the foil is rotated. Fluid is discharged from the spaces between the fins at a rate faster than the fluid can be replenished, thereby creating a deficit of fluid molecules at the upper face of the circular plate while a lower face thereof remains at its original pressure. This creates an imbalance of fluid pressure acting on opposite faces of the circular foil to cause the circular foil to move in the direction of the deficit.

The desired thrust on the circular foil is created and may be adjusted by the rotational speed imparted to the circular plate. Thrust is increased and drag is reduced on the foil by increasing the rotational speed of the circular plate. Movement of the circular foil is adjusted and controlled by increasing the pressure differential between the upper and lower faces of the circular plate.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
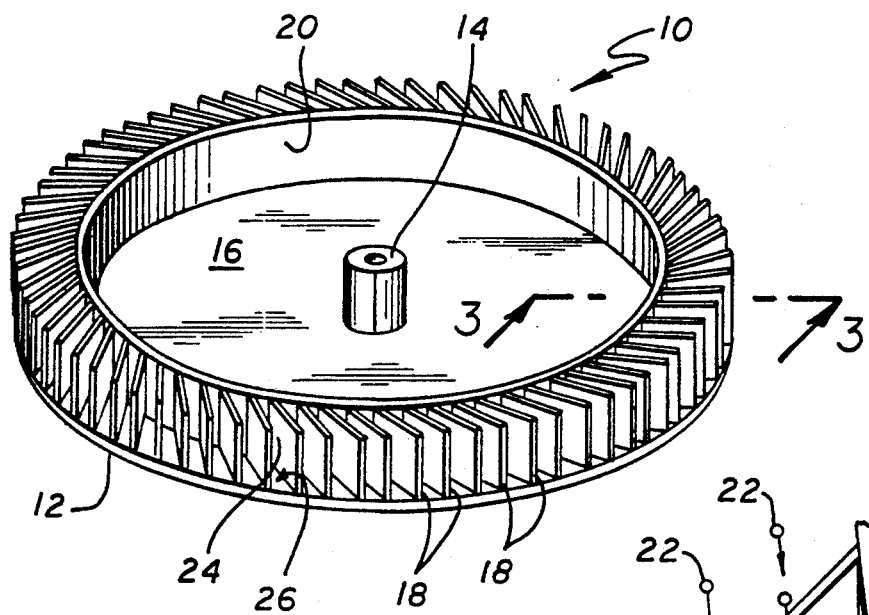
FIG. 1 is a top and front perspective view of a circular foil embodying the invention, shown disconnected from a rotary-motion imparting source.

As shown in the drawings for purposes of illustration, the present invention is concerned with a circular foil, generally designated by the reference number 10. The circular foil 10 is connectable to a source of power for producing thrust in an axial direction when rotated.

In accordance with the present invention, the circular foil 10 comprises a flat circular plate 12 which has a central aperture, and a hub 14 fixed to an upper face 16 of the plate over the aperture. The hub 14 provides means for connecting the foil 10 to an output shaft of a selected power source, such as an electric motor. A plurality of closely spaced-apart fins 18 are fixed to the upper face 16 of the plate 12 and occupy substantially the entire peripheral portion of the plate. A cylindrical hoop 20 is also fixed to the upper surface 16 of the plate 12 adjacent to radially inwardly facing edges of the fins 18, and extends axially from the upper face of the circular plate coextensively with the spaced apart fins.

Each fin 18 extends perpendicularly upwardly relative to the plane of the flat circular plate 12 and is fixed thereto at an angle of up to about 90 degrees as measured from a radial line to a line tangent to the inner vertical hoop 20 circumference. When "up to 90 degrees" is indicated herein, it is not intended to include 90 degrees. For optimum results, each fin 18 is fixed to the upper face 16 of the plate 12 at an angle of from about 35 to 55 degrees relative to the respective tangent. This fin positioning importantly reduces resistance to spinning or rotation of the circular foil 10 (as opposed to a negative angle positioning) while at the same time dispelling fluid molecules 22 from the spaces 24 between the fins 18 at a rapid rate. As the foil 10 begins to spin, the fluid molecules 22 between the fins 18 attempts to follow the spin. As the spin or rotational speed is increased, the fluid molecules 22 between the fins 18 will be thrown out since they will not be able to match the centripetal force needed to keep them in a circular motion. Since the bottom floor 26 adjacent to each fin 18 is sealed, new fluid molecules 22 will replace the old molecules largely from above. As the foil 10 is slowly rotated, the molecules 22 are sucked into these spaces 24 from above and then thrown out on the sides. As the speed is increased, the time taken for the fluid to be sucked in and thrown out is decreased so that the average fluid molecule 22 traveling at high speeds is deflected out before it has time to hit the upper surface 16 between adjacent fins 18. This process creates a deficit of fluid molecules 22 that will strike the upper surface 16 between the fins 18 about the periphery of the flat circular plate 12.

The lower surface of the flat circular plate 12 opposite the upper surface 16 remains at the same pressure throughout. There will, therefore, be a tendency for the flat circular plate 12 to move in the direction of the deficit side (the upper surface 16) due to the imbalance of fluid pressure acting on opposite sides or faces of the plate 12, i.e., the pressure on the upper surface 16 is reduced, the pressure on the lower surface remains constant, and thus movement upward. The force acting on the foil 10 will be proportional to the speed of the fins 18 and the area along the upper surface 16 from which air is being deflected.

The major function of the fins 18 on the circular foil 10 is to deflect the surrounding fluid away from the peripheral portion of the upper surface 16 of the flat circular plate 12. The direction of the deflection should then be directly away from the center of the disc at the hub 14. It is believed that the optimum deflection in a radial direction should occur around 45 degrees or in a range of about 40 to 50 degrees fin orientation (measured from radial). This particular orientation deflects the fluid molecules 22 away from the circular foil 10 while at the same time minimizing drag caused by the interaction of the fins 18 on the surrounding fluid, thus maximizing the efficiency of the process of the present invention.

The above-described circular foil 10 is useful in connection with a method for producing thrust wherein the steps include rotating the foil, controlling the rotation imparted to the plate 12 to discharge fluid molecules 22 from the spaces 24 between adjacent fins 18 radially away from a center portion of the foil, and preventing fluid disposed adjacent to the flat circular plate 12 and radially inwardly of the fins, from flowing radially outwardly and into the spaces between the fins as the foil is rotated, such that fluid is discharged from the spaces between the fins at a rate faster than the fluid can be replenished to cause a pressure reduction on the upper surface 16 while maintaining a lower face of the plate at its original pressure and forming a pressure imbalance. Upon creation of the pressure imbalance the foil 10 is caused to move in the direction of the the pressure reduction. In this regard, the hoop 20 provides means for preventing fluid disposed adjacent to the upper surface 16 of the circular plate 12 and radially inwardly of the fins 18, from flowing radially outwardly and into the spaces 24 between adjacent fins 18 as the circular foil 10 is rotated.

Figure 2:
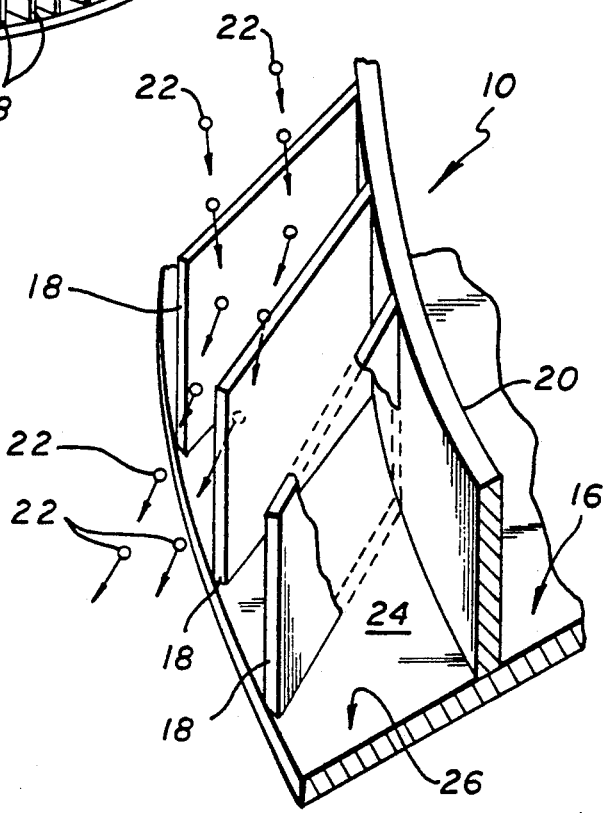
FIG. 2 is an enlarged, fragmented and partially sectional view of the area indicated by the arrow 2 in FIG. 1, illustrating details of several closely spaced-apart fins fixed to an upper face of a circular plate, which occupies substantially the entire peripheral portion of the plate, and further illustrating the manner in which fluid molecules are deflected past the spaces between the fins as the foil is rotated.
Figure 3:
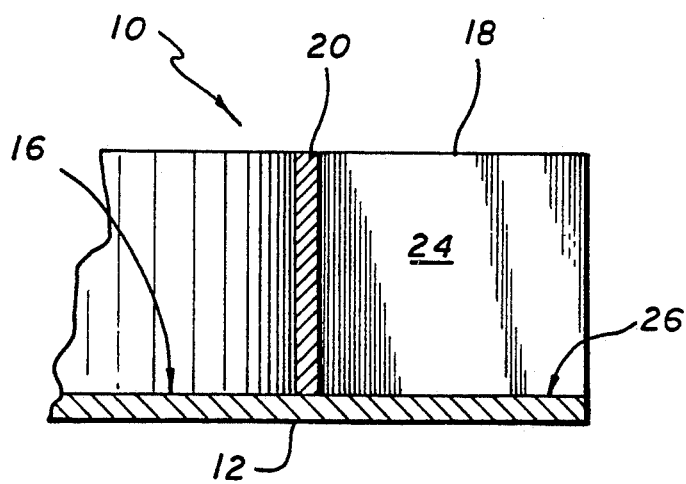
FIG. 3 is an enlarged, fragmented sectional view taken generally along the line 3—3 of FIG. 1.

The particular circular foil 10 illustrated in FIGS. 1–3 is designed to be used wherein the fluid environment is air. In this environment it is noted that the average speed of an air molecule is roughly 1,500 feet per second, and it is the combination of billions of trillions of these molecules striking and rebounding on any given surface that causes pressure. These air molecules are all traveling in different directions but with a virtually even distribution as explained in Boyle's law.

When the circular foil 10 is at rest, the air molecules easily fill the voids or spaces 24 between the fins 18 and react evenly on every exposed surface of the circular foil 10. In order to create a vacuum or partial vacuum within the spaces 24, it is necessary to spin the circular plate 12 fast enough for the fins 18 to strike the air molecules 22 horizontally and thereby deflect them outwardly before they have a chance to strike the upper surface 16 of the plate 12 between the fins 18.

The construction of the circular foil 10 permits a pocket of vacuum to form within the spaces 24 as the plate 12 spins. Because there is no vacuum on the bottom side of the plate 12 there will be a net force generated towards the vacuum side. As the circular foil 10 is rotated faster, a total evacuation of air molecules 22 is effected within at least a portion of the spaces 24, which has two major effects on the function of the circular foil 10. First, total evacuation of air creates a pocket of zero pressure adjacent to portions of the outer periphery of the flat circular plate 12. This in effect translates into very high force generation per unit area on the circular plate 12. Secondly, total evacuation of air from within the spaces 24 means little or no drag during operation. In this regard, the primary source of drag is the fins 18 striking the air. As the foil 10 reaches high speeds, thus disallowing air from replacing the discharged air, the drag due to the fins striking the air is reduced to a very low level because there is less and less air for the fins to strike. This low drag results in extremely high efficiency.

From the foregoing it is to be appreciated that the circular foil 10 of the present invention, when connected to a source of power and rotated at high speeds, efficiently produces thrust in an axial direction. The thrust may be increased and drag reduced by increasing the rotational speed of the plate 12. Moreover, the magnitude of the thrust on the circular foil 10 may be controlled in ways other than modifying the rotational speed of the plate 12. For example, to control the thrust without altering the speed of the plate 12, a washer-shaped ring may be brought down on top of the fins 18. When the circular foil 10 is utilized to impart motion to an object, movement is adjusted and controlled by varying the pressure differential between the upper and lower surfaces of the plate 12, or by controlling the rate at which fluid is dispelled from the spaces 24 between the fins 18 without being fully replenished. The circular foil 10 is of simplified construction and yet may be adapted to operate within a wide variety of fluids by adjusting the radius of the plate 12, the rotational speed of the foil, the height and width of the fins 18, and the size of the spaces 24.

Although a particular embodiment of the invention has been described in detail for purposes of illustration, various modifications may be made without departing from the spirit and scope of the invention. Accordingly, the invention is not to be limited, except as by the appended claims.

I claim:

1. A method for producing thrust in a rotatable circular foil, the steps comprising:

providing the circular foil with a circular plate having a plurality of spaced-apart fins on an upper face thereof, which fins occupy an entire peripheral portion of the plate;

rotating the plate to discharge fluid from a space between adjacent fins radially away from a center portion of the foil; and preventing fluid disposed adjacent to the circular plate and radially inwardly of the fins, from flowing radially outwardly and into the spaces between the fins as the foil is rotated, such that fluid is discharged from the spaces between the fins at a rate faster than the fluid can be replenished to create a deficit of fluid molecules at the upper face of the circular plate while a lower face of the circular plate remains at its original pressure, resulting in an imbalance of fluid pressure acting on opposite faces of the circular foil to cause the circular foil to move in the direction of the deficit.

2. A method as set forth in claim 1, including the step of creating a desired thrust by adjusting the rotational speed imparted to the circular plate.

3. A method as set forth in claim 2, including the step of increasing the thrust and reducing drag by increasing the rotational speed of the circular plate.

4. A method as set forth in claim 1, including the step of adjusting and controlling movement of the circular foil by increasing the pressure differential between the upper and lower faces of the circular plate.

5. A method as set forth in claim 1, including the step of adjusting movement of the circular foil by controlling the rate at which fluid is dispelled from the spaces between the fins without being fully replenished.

6. A method for producing thrust in a rotatable circular foil, the steps comprising:

providing the circular foil with a flat circular structure having a plurality of uniformly closely spaced-apart fins fixed to an upper face of the circular structure and occupying the entire peripheral portion of the structure, wherein each fin extends perpendicularly away from the upper face of the circular structure and is disposed at an angle of up to 90 degrees relative to a respective tangent;

rotating the circular foil;

controlling the rotation imparted to the circular structure to discharge fluid from the space between adjacent fins radially away from a center portion of the foil; and preventing fluid disposed adjacent to the circular structure and radially inwardly of the fins, from flowing radially outwardly and into the spaces between the fins as the foil is rotated, such that fluid is discharged from the spaces between the fins at a rate faster than the fluid can be replenished to cause a pressure reduction on the upper face while maintaining a lower face of the circular structure at its original pressure and form a pressure imbalance, and upon creation of said pressure imbalance causing the circular foil to move in the direction of the pressure reduction.

7. A method as set forth in claim 6, including the step of fixing each fin to the circular structure at an angle from about 45 to 55 degrees relative to the respective tangent.

8. A method as set forth in claim 6, wherein the preventing step comprises the step of fixing a generally cylindrical hoop to the circular structure adjacent to radially inwardly facing edges of the fins.

9. A method as set forth in claim 8, wherein the hoop extends axially from the upper face of the circular structure coextensively with the spaced-apart fins.

10. A method as set forth in claim 6, including the step of creating a desired thrust by adjusting the rotational speed imparted to the circular structure.

11. A method as set forth in claim 10, including the step of increasing the thrust and reducing drag by increasing the rotational speed of the circular structure.

12. A method as set forth in claim 6, including the step of adjusting and controlling movement of the circular foil by increasing the pressure differential between the upper and lower faces of the circular structure.

13. A method as set forth in claim 6, including the step of adjusting movement of the circular foil by controlling the rate at which fluid is dispelled from the spaces between the fins without being fully replenished.

* * * * *